Sept. 20, 1932.    I. A. BAUM    1,878,807
MOLDING FOR METAL FRAMES
Filed Oct. 3, 1928
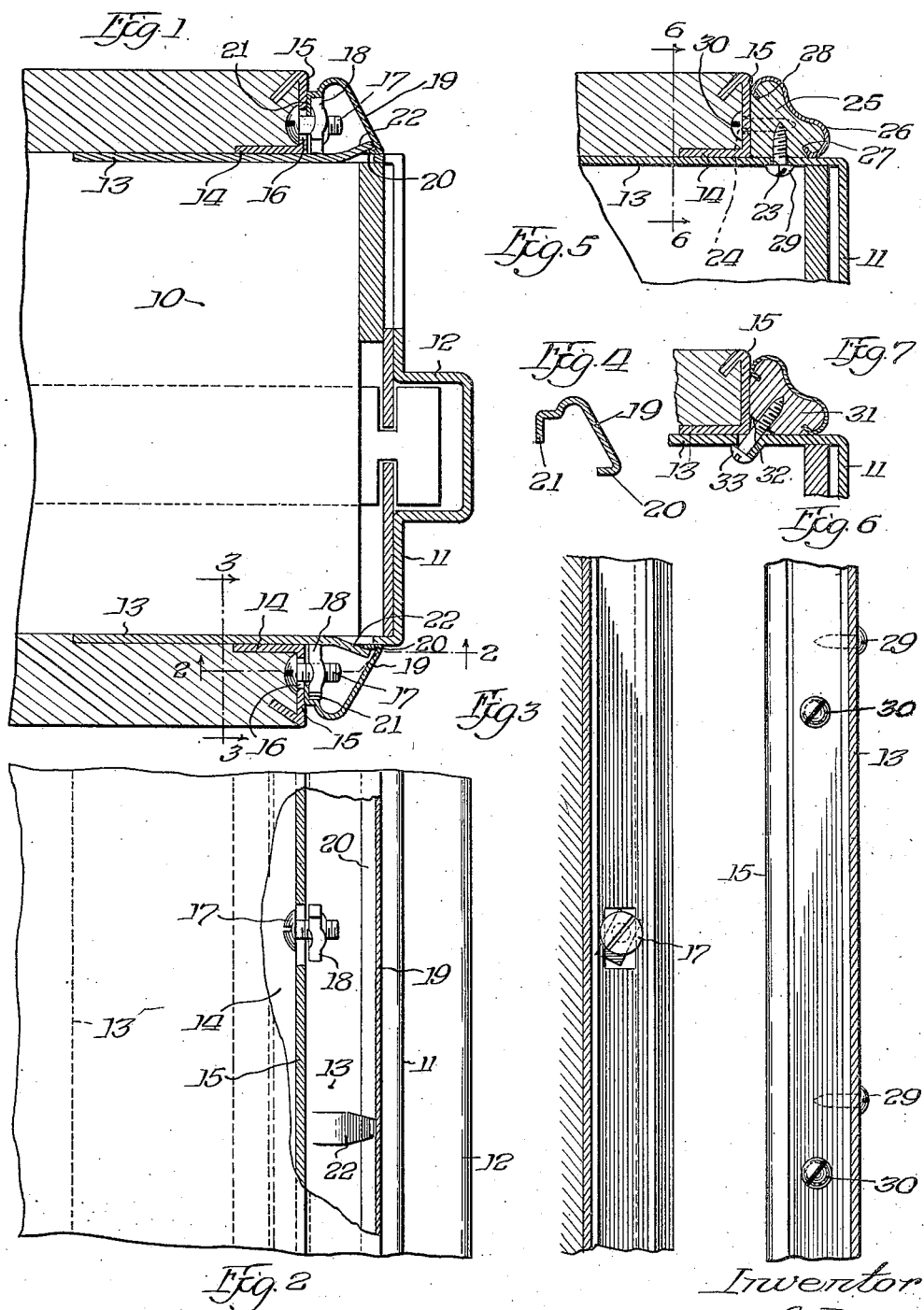
Inventor
Isaac A. Baum,
By Murray + Murray
Attys Patented Sept. 20, 1932

1,878,807

UNITED STATES PATENT OFFICE

ISAAC ALBERT BAUM, OF CHICAGO, ILLINOIS

MOLDING FOR METAL FRAMES

Application filed October 3, 1928. Serial No. 310,047.

My invention relates to metal frames for wall openings and particularly to means for attaching metal or other molding strips to such metal frames.

It has been found in practice that the metal frame design in which a right angular space is provided between the frame and plaster finish flange is objectionable to some architects. This necessitates the mounting of a molding strip of desired contour in the angle. However, the provision of means for attachment of such strips has presented a problem not easily solved. Such means should adapt themselves to quick and simple operation without special tools, and should be so arranged that the operations may be carried out either in the shop or in the field, after installation of the frames.

To accomplish the desired result I have designed fasteners that may be applied with a minimum of labor by the use of no other tool than a screw-driver.

The invention will be more readily understood by reference to the accompanying drawing, in which Fig. 1 is a transverse sectional view through a portion of a wall and frame to which a metal molding strip has been applied;

Fig. 2 is a side elevation partly in section of the same construction, the sectional view being on the line 2—2 of Fig. 1;

Fig. 3 is a sectional view on the line 3—3 of Fig. 1;

Fig. 4 is a sectional view of the molding strip;

Fig. 5 is a transverse sectional view of the means for attachment of a slightly modified form of molding strip;

Fig. 6 is a back view taken on the line 6—6 of Fig. 5.

Fig. 7 is a sectional view of a further modification of strip attaching means.

In the drawing, and referring particularly to Figs. 1–4 inclusive, I have illustrated a tile wall 10, and a metal frame member of channel shape having a web 11, integral hollow stop 12, and side flanges 13 that project rearwardly and lie alongside of the tile. Plaster finishing members having a base 14 and a flange 15, arranged perpendicular to the face of the flanges 13, are secured to said flanges by welding the base 14 of the plaster finishing members to the face of the flanges 13. The flange 15 is provided with elongated openings 16 located at spaced intervals for the reception of screw members 17, the heads of which lie against the inside face of the member 15. The nut 18 employed is elongated; in other words, sufficiently narrow to pass through the slot and sufficiently long to prevent complete rotation of the nut when in place, the nut, when partly rotated, acting in the usual manner.

The molding member, best shown in Fig. 4, consists of a body portion 19 of any suitable contour and inwardly projecting continuous flanges 20–21. Located at intervals in the length of the frame flanges 13 are tongues 22 struck out from the body of the metal and adapted to receive the flange 20 of the molding strip. The flange 21 is adapted to abut against the finish flange 15 and to underlie and be clamped by the nut 18. Thus, in applying the molding, the strip is merely forced laterally inwardly, the tongues temporarily holding the strip in place. The stove bolts with the elongated nuts are then passed through the slotted openings and the screw turned. The nut is prevented from complete rotation due to the lack of space and the strip is then securely clamped in position.

In the construction shown in Figs. 5 and 6, the described parts remain the same, the exception being that the frame flange and finish flange are provided with spaced round apertures 23–24 respectively, and the molding strip is composed of a body of wood, 25, having a metal cover 26. The margins 27–28 of the metal strip are seated in kerfs in the wood, thus leaving two sides of the wood exposed. Wood screws 29–30 are passed through the openings 23–24 into the wood.

In the construction of Fig. 7, the strip 31 is the same as the strip 25 except that the inside edge is flattened to provide a continuous flat surface 32. Holes are punched out of the frame element 13, the displaced metal remaining attached at one side and being so disposed as to act as an abutment or seat for a screw head 33. The screw may be driven diagonally inward to the position shown in a much more convenient manner than the screws shown in Fig. 6. Further, a single screw serves to pull the strip inward in two directions.

Obviously other similar forms of application of molding strips may be devised, and I do not wish to be limited except as indicated in the appended claims.

I claim:

1. In combination, a frame having a rearwardly extending flange adapted to lie alongside of a wall, a plaster finish flange projecting from the face of said frame flange, a metal molding strip in the angle between the flanges, and screw means extending through the finish flange from the inside for holding one side of said molding strip.

2. In combination, a frame having a rearwardly extending flange adapted to lie alongside of a wall, a plaster finish flange projecting from the face of said frame flange, a metal molding strip in the angle between the flanges, screw means for extending through the finish flange from the inside for holding one side of said molding strip, and other means for securing another side of said strip to the frame flange.

3. In combination, a frame having a rearwardly extending flange adapted to lie alongside of a wall, a plaster finish flange projecting from the face of said frame flange, a metal molding strip in the angle between the flanges, screw means for extending through the finish flange from the inside for holding one side of said molding strip, and tongues formed on said flange for engaging and holding another side of said strip.

In testimony whereof I have affixed my signature.

ISAAC A. BAUM.